US012755872B2

(12) United States Patent
Yuan et al.

(10) Patent No.: US 12,755,872 B2
(45) Date of Patent: Oct. 6, 2026

(54) DURABLE ACTIVE ANTI-ICING CONDUCTOR FOR USE IN A LOW-TEMPERATURE AND HIGH-HUMIDITY ENVIRONMENT, AND A METHOD FOR PREPARING THE SAME

(71) Applicant: CHONGQING UNIVERSITY, Chongqing (CN)

(72) Inventors: Yuan Yuan, Chongqing (CN); Huiying Xiang, Chongqing (CN); Ruijin Liao, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 19/145,547

(22) PCT Filed: Dec. 18, 2023

(86) PCT No.: PCT/CN2023/139445
§ 371 (c)(1),
(2) Date: Jul. 3, 2025

(87) PCT Pub. No.: WO2024/193134
PCT Pub. Date: Sep. 26, 2024

(65) Prior Publication Data
US 2026/0120922 A1 Apr. 30, 2026

(30) Foreign Application Priority Data
Mar. 22, 2023 (CN) ......................... 202310283923.1

(51) Int. Cl.
*H01B 13/22* (2006.01)
*H01B 1/02* (2006.01)
(Continued)

(52) U.S. Cl.
CPC ........... *H01B 13/221* (2013.01); *H01B 1/023* (2013.01); *H01B 7/285* (2013.01); *H01B 13/227* (2013.01)

(58) Field of Classification Search
CPC .... H01B 13/221; H01B 13/227; H01B 13/02; H01B 1/023; H01B 7/285; H01B 5/08;
(Continued)

(56) References Cited

U.S. PATENT DOCUMENTS

2016/0312374 A1* 10/2016 Duffy ..................... C25D 11/06
2023/0023650 A1* 1/2023 Yuan ...................... C25D 11/12

FOREIGN PATENT DOCUMENTS

CN 101577151 A 11/2009
CN 109453966 A 10/2018
(Continued)

OTHER PUBLICATIONS

PCT Written opinion mailed on Mar. 29, 2024 for PCT/CN2023/139445 of which the subject application is the U.S. national phase application.

*Primary Examiner* — Roshn K Varghese
(74) *Attorney, Agent, or Firm* — Wood, Phillips, Katz, Clark & Mortimer

(57) ABSTRACT

The present invention relates to the field of anti-icing material preparation, and in particular to a durable active anti-icing conductor for use in a low-temperature and high-humidity environment, and a method for preparing the same. The conductor comprises a dendritic composite porous structure formed on an aluminum substrate; the dendritic composite porous structure is configured to comprise an upper layer and a lower layer; a pore diameter of an upper pore in the upper layer is smaller than a pore diameter of a lower pore in the lower layer; a pore depth ratio of the upper
(Continued)

pore to the lower pore is less than 1:2; both the upper pore and the lower pore are filled with a modifier and a lubricant.

5 Claims, 10 Drawing Sheets

(51) Int. Cl.
*H01B 7/28* (2006.01)
*H01B 7/285* (2006.01)

(58) Field of Classification Search
CPC . H01B 5/00; C09K 3/18; C23F 13/005; C23F 2213/30; C25D 11/16; C25D 11/024; C25D 11/08; C25D 11/10; C25D 11/12; C25D 11/246
See application file for complete search history.

(56) References Cited

FOREIGN PATENT DOCUMENTS

| | | | |
|---|---|---|---|
| CN | 108950641 | A | 12/2018 |
| CN | 110504062 | A | 11/2019 |
| CN | 110863225 | A | 3/2020 |
| CN | 113450945 | A | 9/2021 |
| CN | 113528010 | A | 10/2021 |

* cited by examiner

DURABLE ACTIVE ANTI-ICING CONDUCTOR FOR USE IN A LOW-TEMPERATURE AND HIGH-HUMIDITY ENVIRONMENT, AND A METHOD FOR PREPARING THE SAME

TECHNICAL FIELD

The present invention relates to the field of anti-icing material preparation, and in particular to a durable active anti-icing conductor for use in a low-temperature and high-humidity environment, and a method for preparing the same.

BACKGROUND

Icing is a common natural phenomenon that poses significant safety risks to exposed infrastructure. For example, ice accretion on power transmission lines can severely threaten the operational safety of railway, electrical, network, and telecommunication systems. Many researchers have sought to design durable anti-icing surfaces to prevent damage to transmission lines caused by ice accretion. Superhydrophobic surfaces (SHPs), inspired by lotus leaves, have emerged as ideal anti-icing surfaces due to their micro/nanoscale roughness and low surface energy. The micro/nanoscale roughness of SHPs traps a large amount of air and forms an “air cushion”, allowing water droplets to rest in the Cassie state (i.e., incomplete contact between liquid and solid, with air present). However, under low temperatures and high humidity, SHPs often fail. Water vapor can indiscriminately condense on the tops, sides, and bottoms of the micro-protrusions of SHPs, causing the surface to transition from superhydrophobic to hydrophilic, thereby losing its anti-icing performance. Water droplets undergo a transition from the Cassie state to the Wenzel state (i.e., complete contact between liquid and solid, with no air at the interface). Subsequent frosting within the microstructures accelerates ice formation and leads to mechanical interlocking between the ice and the microstructure, which makes de-icing more difficult. Inspired by pitcher plants, slippery liquid-infused porous surfaces (SLIPSs) have been developed by infusing lubricant into porous structures. SLIPSs replace air with lubricant and exhibit excellent anti-icing performance. The lubricant film retained inside the porous surface exhibits non-wettability, reducing ice adhesion strength. Although water droplets on SLIPSs remain in the Wenzel state, the lubricant filled in the porous structure effectively mitigates or prevents failure under a low-temperature and high-humidity environment caused by water vapor condensation and frost formation, as observed in SHPs. Moreover, the self-healing capability of SLIPSs allows them to recover their anti-icing performance after lubricant depletion. Therefore, SLIPSs demonstrate promising potential for application in the field of anti-icing.

However, SLIPSs face durability challenges in practical applications due to the rapid depletion of lubricant. Studies have shown that capillary force is a key factor in retaining lubricant within the porous structure. Capillary force refers to the force driving a liquid, either wetting or non-wetting, to naturally rise or fall within a capillary tube. The capillary force is inversely proportional to the pore diameter. In other words, under a constant pore depth, the smaller the pore diameter, the greater the capillary force, and the more difficult it is for the lubricant to be depleted within the porous structure. Conversely, a larger pore diameter results in easier depletion of the lubricant. However, structures with larger pore diameters can store more lubricant than those with smaller pore diameters. Existing studies have shown that composite porous structures offer the advantages of combining two kinds of pores with different pore diameters, thereby having the potential to address both the need for a large lubricant capacity and the reduction of lubricant consumption simultaneously.

However, in order to prepare a composite porous structure with improved anti-icing durability, it is insufficient to consider only the storage and consumption of lubricant. In practical applications, especially under a low-temperature and high-humidity environment, partial icing may still occur even on hydrophobic surfaces of anti-icing conductors. As ice continues to form, the amount of accreted ice on the surface of anti-icing conductors gradually increases. When the gravitational force of the ice exceeds the ice adhesion strength between the ice and the conductor surface, spontaneous ice shedding may occur, potentially triggering de-icing-induced conductor jumping or galloping. Such large-amplitude de-icing-induced conductor jumping or galloping may damage the conductor, reduce its service life, and pose serious risks to the operational safety of power transmission lines. Currently, passive de-icing methods primarily rely on current-induced melting, which often requires power outages during operation. In regions with severe icing, this de-icing process may take several hours or even tens of hours. Additionally, conventional DC de-icing equipment is costly—for example, a 500 kV DC de-icing unit costs about 30 to 50 million RMB, while a 220 kV unit costs about 20 million RMB. Considering high equipment and labor costs, de-icing is typically applied only to major 220 kV power grids. At present, there are no effective anti-icing or de-icing solutions for medium- and low-voltage transmission lines, distribution networks, or ground wires. Therefore, there is an urgent need for anti-icing conductors with material-level performance enhancements that can inhibit ice formation from the initial stage of ice accretion or slow the progression of ice accretion while also offers extended service life.

The prior art CN2021108203856 discloses a self-healing anti-icing conductor having a composite porous structure. The composite porous structure on the anti-icing conductor is configured to be a two-layer structure, wherein only the inner pore is filled with a healing agent, while the outer pore comprises an air cushion. It can be seen that the total storage capacity for the healing agent of this patent is relatively limited. Moreover, the number of self-healing cycles and the self-healing speed of the composite porous structure of this patent are insufficient to meet the requirements for long-term operation in extreme weather environments, such as high altitudes or regions prone to heavy icing. In particular, the outer pore of the two-layer porous structure in the conductor is an air cushion; once mechanical interlocking occurs between the structure and the ice, de-icing becomes extremely difficult.

In summary, further research into anti-icing materials is essential to obtain an anti-icing conductor with extended service life and enhanced anti-icing performance.

SUMMARY

In view of this, the objective of the present invention is to provide an active anti-icing conductor for use in a low-temperature and high-humidity environment, and a method for preparing the same. The specific technical solutions are provided as follows.

An active anti-icing conductor for use in a low-temperature and high-humidity environment, the active anti-icing conductor is a dendritic composite porous structure formed on an aluminum substrate; the dendritic composite porous structure is configured to comprise an upper layer and a lower layer; a pore diameter of an upper pore in the upper layer is smaller than a pore diameter of a lower pore in the lower layer, and a pore diameter ratio of the upper pore to the lower pore is 1:3~1:2; a pore depth ratio of the upper pore to the lower pore is less than 1:2; a ratio of number of the upper pore to number of the lower pore is 4-6:1; both the upper pore and the lower pore are filled with a modifier and a lubricant; a surface porosity of the dendritic composite porous structure is 50%-66% with an inter-pore spacing of 10-38 nm.

Further, the surface porosity of the dendritic composite porous structure is 66%.

Further, a total pore depth of the dendritic composite porous structure is 5-31 μm.

Preferably, the total pore depth of the dendritic composite porous structure is 9-31 μm.

Further, a surface ice adhesion strength of the active anti-icing conductor is not greater than 5 kPa.

Further, the modifier filled in the dendritic composite porous structure is silane-ethanol. Silane functions as the modifier and ethanol functions as a dispersant to dissolve silane in the solution. The silane molecules are ultimately grafted onto the pore surface of the composite porous structure, while the ethanol volatilizes. The lubricant is a non-volatile lubricant, which may be selected from the group consisting of perfluoropolyether, silicone oil, ionic liquid, and a lubricant with a viscosity greater than 50 cps, and any combination thereof.

A method for preparing the above-mentioned active anti-icing conductor, the method comprises two anodization processes and one pore expansion process, specifically comprising the following steps:

(1) First anodization: placing a cleaned aluminum substrate in an $H_2C_2O_4$ electrolyte, and applying an anodization current of 0.08~0.16 A/cm$^2$ for 6-10 min to form an upper porous structure (also referred to as oxalic acid small pore);

(2) Second anodization: placing the product obtained in step (1) in an $H_3PO_4$ electrolyte, and applying an anodization current of 0.08~0.16 A/cm$^2$ for 7-12 min to form a lower porous structure (also referred to as phosphoric acid large pore); during the process of forming the lower porous structure, the dissolution of the upper porous structure occurs (i.e., the lower porous structure forms while the upper porous structure dissolves), and a concentration of an aluminum ion is adjusted to 600-700 mg/L;

(3) Pore expansion: immersing the formed two-layer porous product in an $H_3PO_4$ solution for 0-45 min to perform pore expansion (expand the pore diameter of the formed two-layer porous product), and washing and drying the resulting dendritic composite porous structure;

(4) Filling with a modifier and a lubricant: filling the dendritic composite porous structure obtained in step (3) with a modifier using a vacuum infusion method to modify the dendritic composite porous structure, followed by filling with a lubricant, wherein the modifier is silane-ethanol.

Further, in the second anodization of step (2), a concentration of an aluminum ion is adjusted to a range of 600-700 mg/L. The adjustment method includes directly adding a compound comprising an aluminum ion, or increasing a proportion of a used electrolyte by approximately 40% in a freshly prepared electrolyte to achieve the required aluminum ion concentration.

Further, a mass percentage of the silane-ethanol used in step (4) is 2 wt. %.

Beneficial Technical Effects

The present invention provides an active anti-icing conductor for use in a low-temperature and high-humidity environment. Compared with anti-icing conductors in the prior art, the present invention offers two major advantages: (1) significantly extended service life, and (2) lower surface ice adhesion strength, thereby achieving active anti-icing.

First, the active anti-icing conductor provided by the present invention is a dendritic composite porous structure, in which all pore structures are filled with a modifier and a lubricant. This structure is obtained through a multidimensional design of the composite porous structure, including: smaller pore diameters of the upper pores in the upper layer can reduce lubricant consumption; larger pore diameters of the lower pores in the lower layer can facilitate the enhancement of lubricant reservoir (lubricant storage capacity); the number of the upper pores is high, the number of the lower pores is low, and the upper pores are arranged densely, so that a ratio of the number of the upper pores to the number of the lower pores reaches 4-6:1. The cross-sectional morphology of the overall composite porous structure resembles a dendritic pattern. Compared to conventional single-layer porous structures, the dendritic composite porous structure can store more lubricant. Moreover, by optimizing the upper-to-lower pore depth ratio, the self-healing speed of the pores is maximized (the self-healing time of the pores is minimized). Thus, the synergistic effects of this multi-dimensional design of the composite porous structure enable high modifier/lubricant storage with slow consumption and rapid self-healing of the pores, thereby significantly extending the service life of the anti-icing conductor.

Second, the surface ice adhesion strength of the active anti-icing conductor of the present invention is not greater than 5 kPa by further optimization of surface porosity and inter-pore spacing. This value is significantly lower than the industry-recognized critical threshold of 20 kPa (based on an ice thickness of 30 cm). According to China's industry standards, when ice accretion on a conductor reaches a thickness of 30 cm, de-icing via power outage will be performed, as the gravitational force of the ice is close to exceeding the ice adhesion strength between the ice and the conductor surface (20 kPa), making the ice prone to spontaneous detachment and triggering de-icing jumping or galloping of the conductor. In contrast, the surface ice adhesion strength of the conductor provided by the present invention is not greater than 5 kPa. As a result, the ice will automatically detach well before ice accretion on a conductor reaches a thickness of 30 cm. This eliminates the need for costly power-outage-based de-icing operations, and the detached ice does not trigger large-amplitude de-icing jumping or galloping of the conductor, thereby protecting the conductor and achieving the purpose of active anti-icing.

Finally, the present invention provides a method for preparing the dendritic composite porous structure. This method includes two anodization processes using different acidic solutions and a pore expansion process. The method primarily controls the anodization current and duration to obtain porous structures with different pore depth ratios and desired total pore depths. Additionally, by adjusting the aluminum ion concentration or the pore expansion duration, dendritic porous structures with different porosity levels can be obtained. Through the synergistic effects of these multiple features, the resulting conductor exhibits both long-term durability and active anti-icing performance.

DESCRIPTION OF DRAWINGS

To make the embodiments of the present invention or the technical solutions in the prior art clearer, the drawings required to be used in the description of the embodiments or the prior art will be briefly introduced below. It is obvious that the drawings described below are some embodiments of the present invention, and that other drawings can be obtained from these drawings for those of ordinary skill in the art without making inventive effort.

(a) 37%, (b) 50%, (c) 66%, and (d) 72%.

Figure 6:
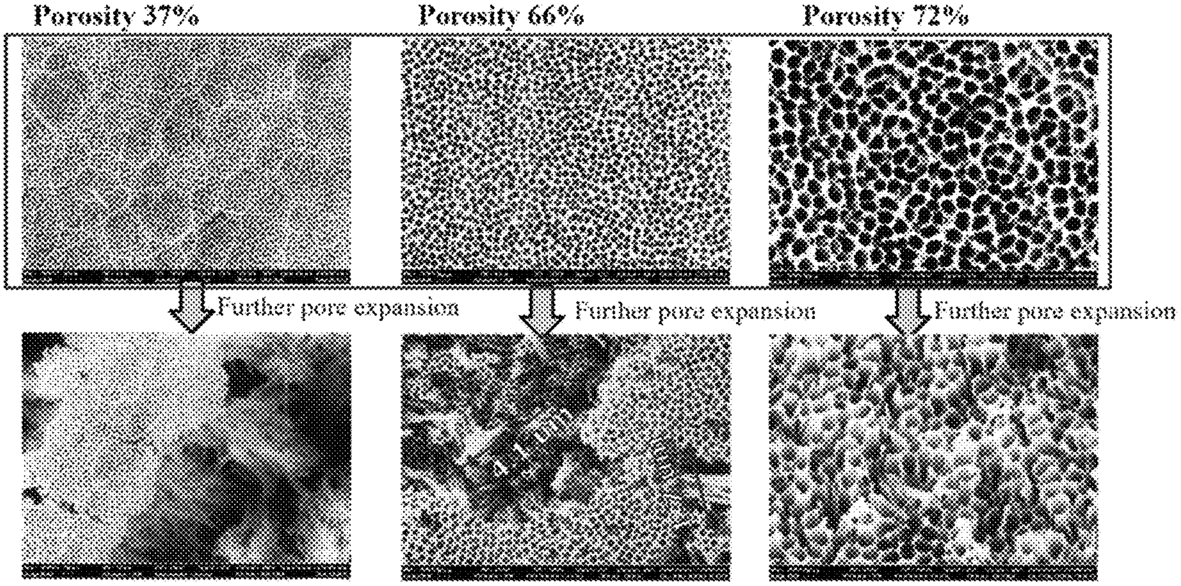

FIG. 6 is an enlarged view of the porous structures with different porosity levels.

Figure 7:
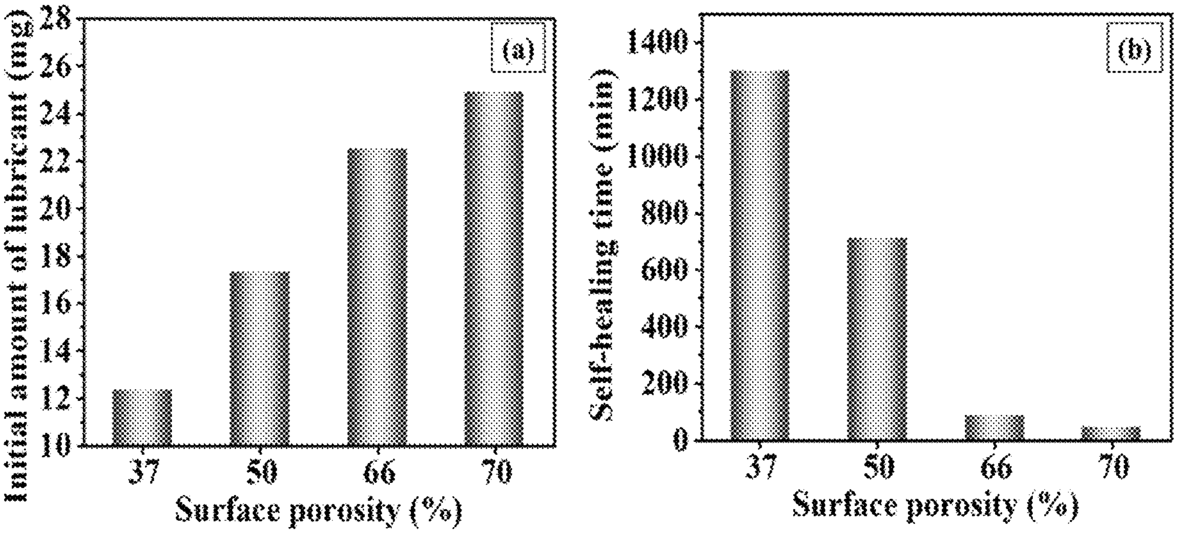

FIG. 7 shows the experimental results of initial lubricant amount and self-healing time under different porosity levels in a slow water droplet deposition experiment ((a) initial amount of lubricant; (b) self-healing time).

Figure 8:
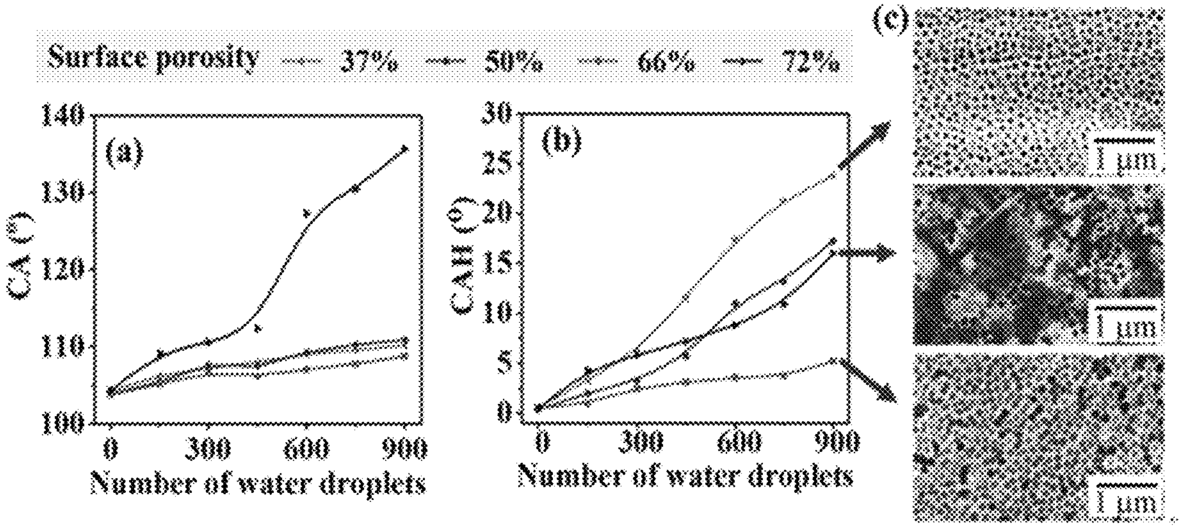

FIG. 8 shows the experimental results of CA, CHA, and surface morphology under different porosity levels in a slow water droplet deposition experiment ((a) contact angle (CA); (b) contact angle hysteresis (CHA); (c) surface morphology after 900 droplets deposition).

Figure 9:
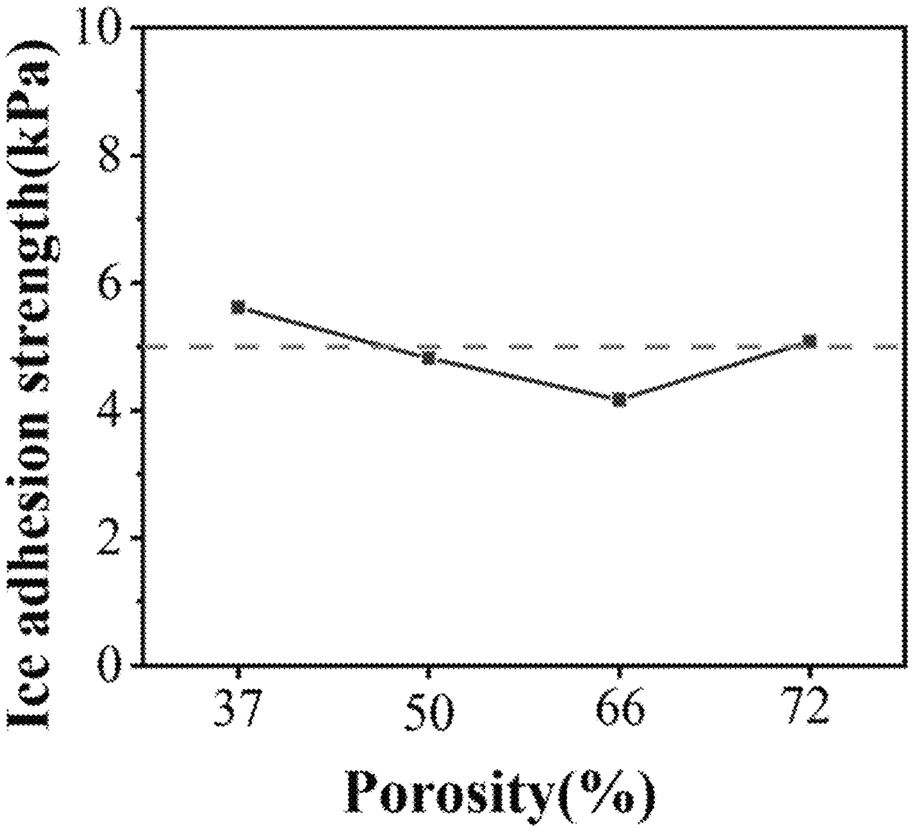

FIG. 9 is a graph showing the variation in ice adhesion strength with porosity.

Figure 10:
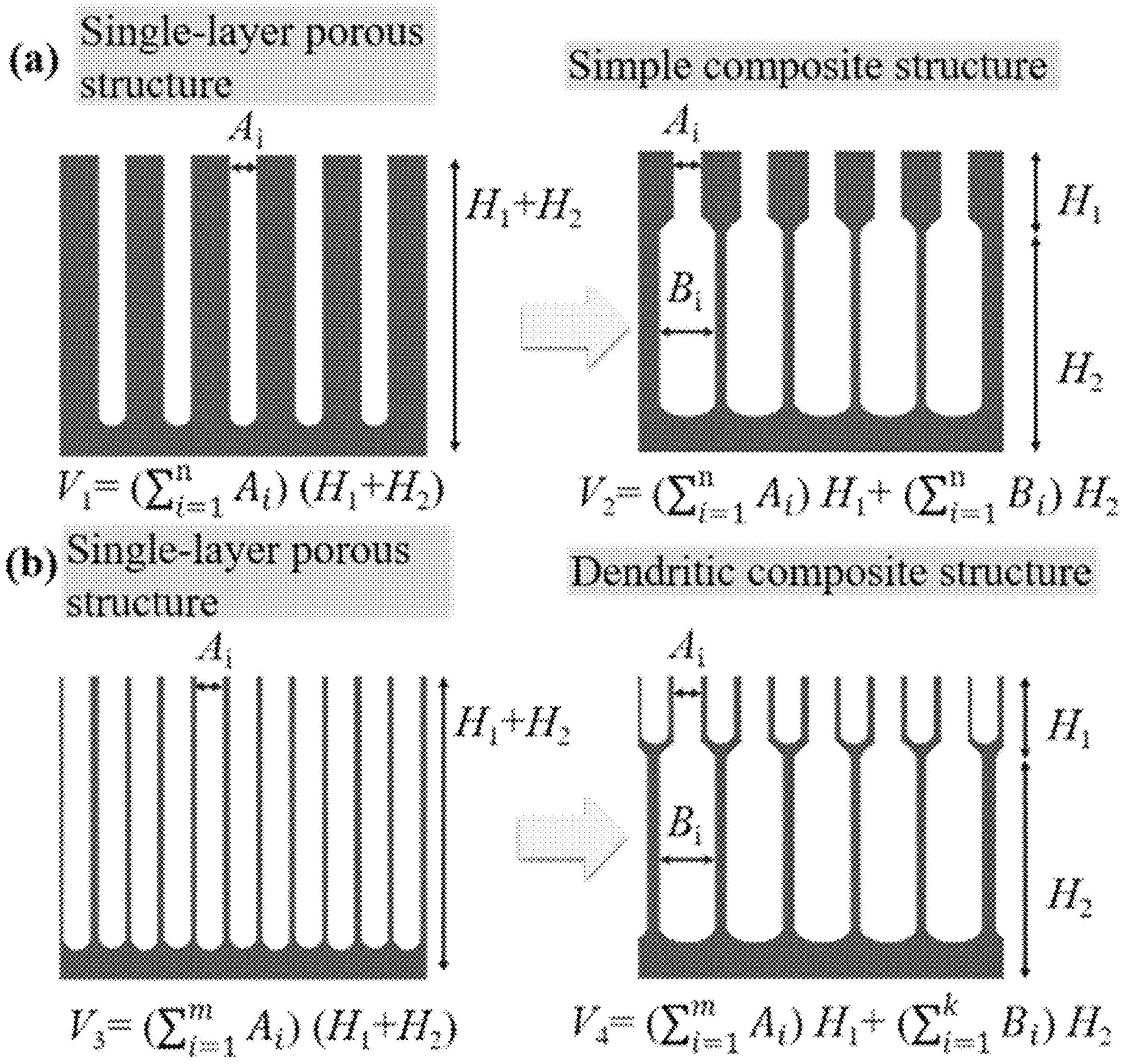

FIG. 10 is a diagram showing the volume comparison of different porous structures under constant inter-pore spacing ((a) single-layer porous structure vs. simple composite porous structure; (b) single-layer porous structure vs. dendritic composite porous structure).

Figure 11:
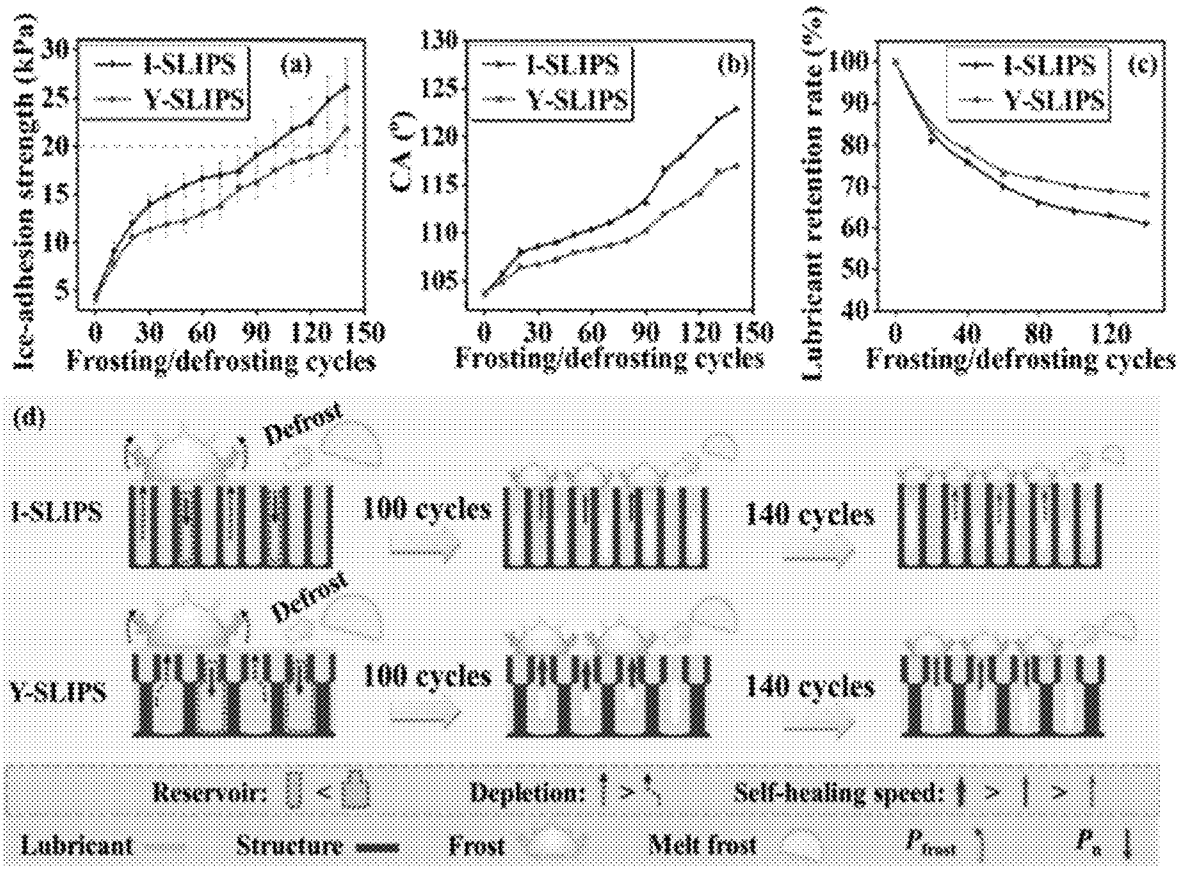

FIG. 11 shows the experimental results of frosting/defrosting cycles on the conventional single-layer porous surface and the dendritic porous surface ((a) effect of frosting/defrosting cycles on ice adhesion strength; (b) CA value during frosting/defrosting cycles; (c) effect of frosting/defrosting cycles on lubricant retention rate; (d) comparison of frost particle size between different porous structures).

Figure 12:
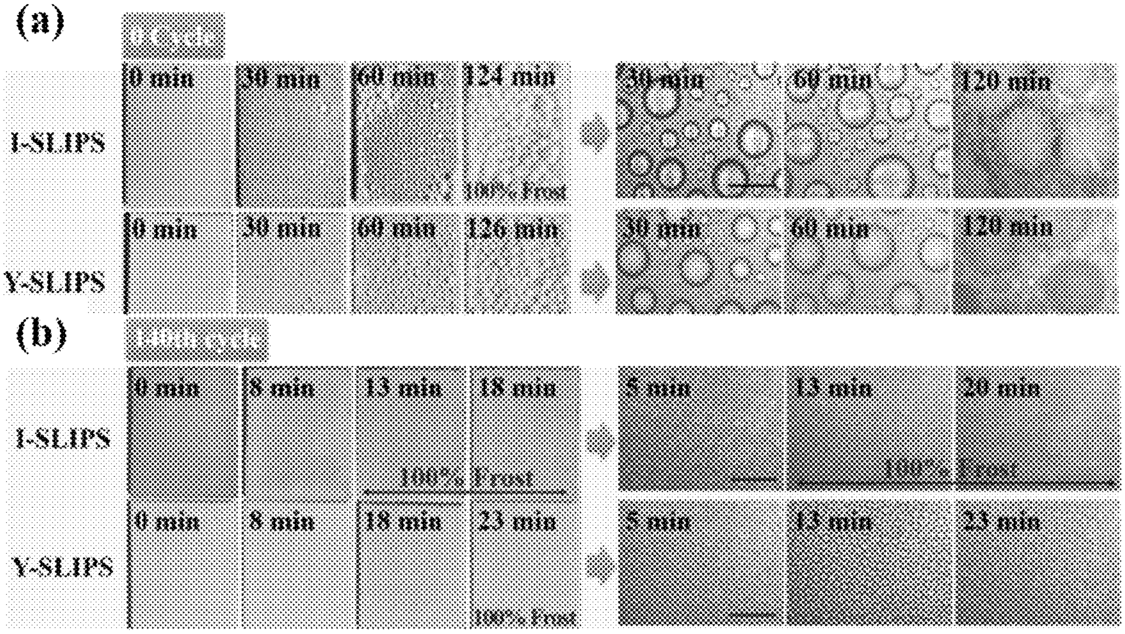

FIG. 12 shows the experimental results of frosting/defrosting cycles on the conventional single-layer porous surface and the dendritic porous surface ((a) frosting time and state of different porous structures without frosting/defrosting cycles; (b) frosting time and state after 140 frosting/defrosting cycles).

Figure 13:
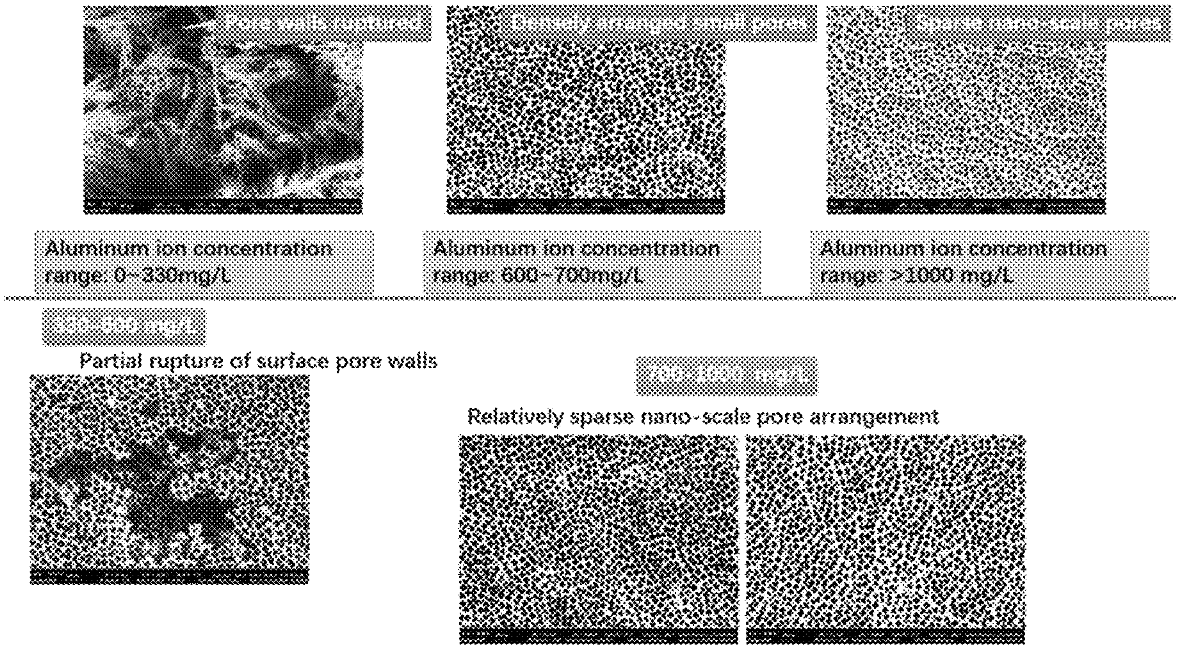

FIG. 13 shows the surface morphology of dendritic composite porous structures formed under different aluminum ion concentrations.

Figure 14:
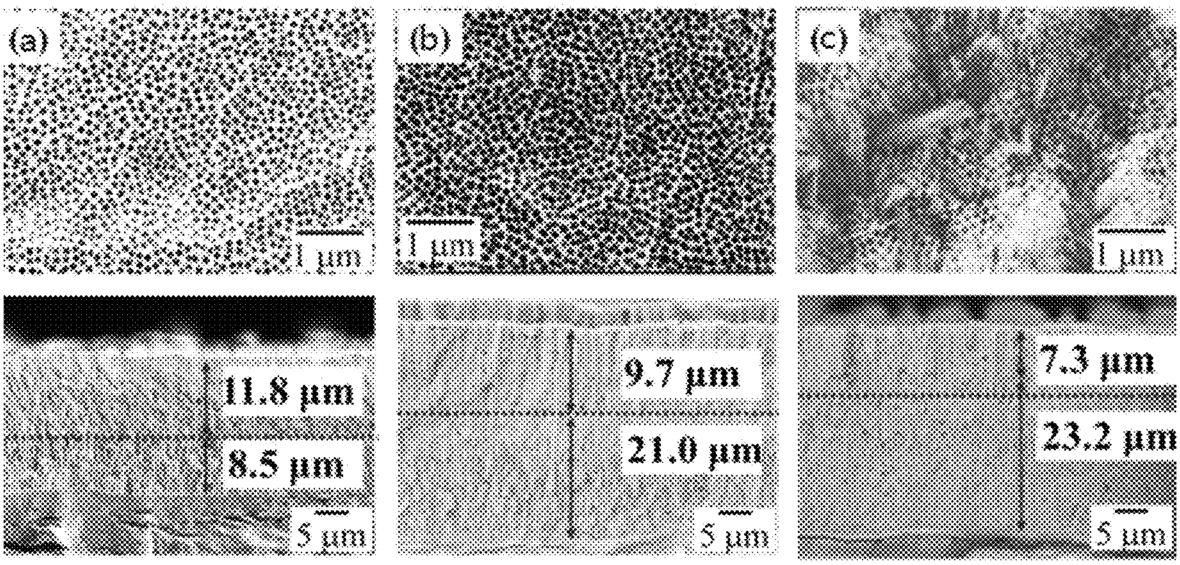

FIG. 14 shows the surface morphology of dendritic composite porous structures formed under different anodization durations or current densities.

Figure 15:
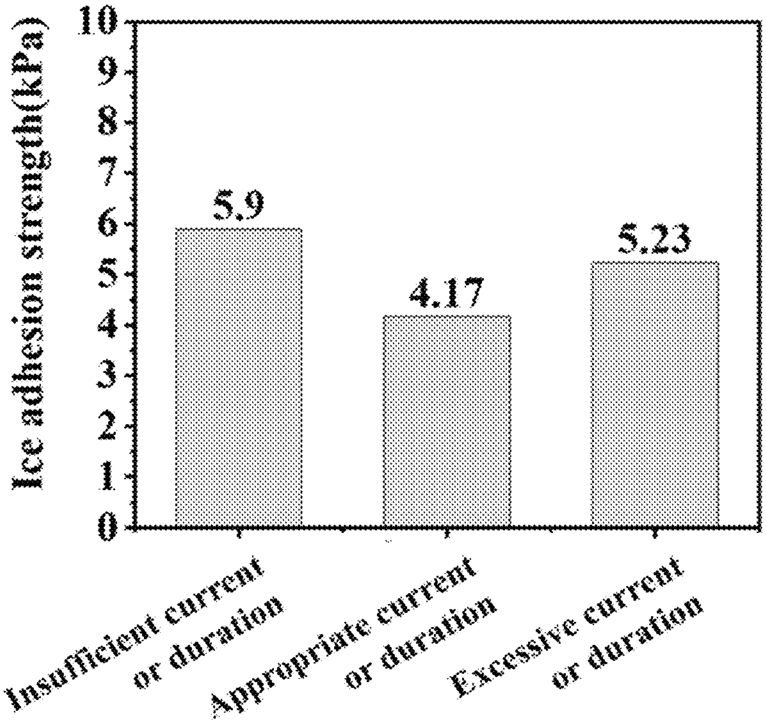

FIG. 15 shows the ice adhesion strength of samples under different anodization durations or current densities.

DETAILED DESCRIPTION

To make the objective, the technical solutions and advantages of the embodiments of the present invention clearer, the technical solutions of the embodiments of the present invention will be clearly and completely described below in combination with drawings. It is obvious that the described embodiments are some of the embodiments of the present invention, not all of the embodiments. Based on the embodiments of the present invention, all other embodiments obtained by those of ordinary skill in the art without making inventive effort shall belong to the protection scope of the present invention.

It should be noted that the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

As used herein, the term "about", typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

As used in the present invention, the term "active anti-icing conductor" refers to a conductor capable of inhibiting ice formation from the initial stage of ice accretion or slowing the progression of ice accretion, which is primarily achieved through a surface ice adhesion strength that is lower than that of conventional anti-icing conductors (20 kPa).

As used in the present invention, the term "porosity" refers to the surface porosity of a cross-section, which is calculated as the ratio of the total area of the pores (Ap) to the total surface area (A), i.e., $$P = \frac{\sum A_P}{A}.$$

As used in the present invention, the term "inter-pore spacing" refers to the distance between adjacent pores on a cross-section.

Embodiment 1

Preparation

Method for Preparing an Anti-Icing Conductor Comprising a Dendritic Composite Porous Structure (1) An aluminum plate is cut into dimensions of 2.5×2.0×0.1 $cm^3$, then cleaned with ethanol to remove surface contaminants. A 1 mol/L NaOH solution is used to remove the oxide on the aluminum surface, followed by rinsing with deionized water to remove residual alkali. A porous structure is formed on the clean sample surface via anodization, using the aluminum plate as the anode and a stainless steel plate as the cathode. A dendritic porous structure with a two-layer pore configuration is obtained through a two-step anodization process. In the first step, first anodization is performed in a 0.3 mol/L $H_2C_2O_4$ electrolyte for 6-10 min to form the upper pores (also referred to as oxalic acid small pores). In the second step, second anodization is performed in 0.3 mol/L $H_3PO_4$ electrolyte for 7-12 min to form the lower pores (referred to as phosphoric acid large pores). In the third step, the resulting two-layer porous structure is immersed in 5 wt. % $H_3PO_4$ solution at 30° C. for 45 min for pore expansion. By adjusting the anodization current (0.08~0.16 $A/cm^2$) and anodization duration, dendritic porous structures with different depth ratios, as well as different total pore depths, are obtained. Additionally, dendritic porous structures with different porosity levels are obtained by controlling either the aluminum ion concentration (600-1000 mg/L) or the duration of the pore expansion process (0-45 min). The prepared porous surface is then rinsed with ethanol and dried in an oven at 75° C.

(2) The dendritic porous structure obtained in step (1) is immersed in a 2 wt. % silane-ethanol solution to modify the pores and enhance the surface affinity for the lubricant. To ensure that the nano-scale pores are completely filled with the modifier, a vacuum infusion method is used in the embodiment. Specifically, the prepared porous sample is placed in a vacuum chamber for 5 hours to remove air from the pores. The lubricant is then infused into the pore structure of a sample and maintained for 12 hours. The sample is taken out and excess lubricant is blown off the surface using compressed air. Finally, the lubricated surface is successfully prepared.

Method for Preparing an Anti-Icing Conductor Comprising a Conventional Single-Layer Porous Structure (1) The aluminum plate is first anodized in a 0.3 mol/L $H_2C_2O_4$ electrolyte, followed by pore expansion in a 5 wt. % $H_3PO_4$ solution at 30° C.

(2) The single-layer porous structure is then filled with the modifier using procedures similar to step (2) in the preparation of an anti-icing conductor comprising a dendritic composite porous structure.

Embodiment 2

Characterization of the Dendritic Composite Porous Structure

Experiment for Determining the Optimal Pore Depth Ratio and Porosity

1. Characterization

The surface and cross-sectional morphology are characterized using a field-emission scanning electron microscope (SEM, Zeiss Auriga, Germany). The contact angle (CA) is measured using a contact angle goniometer (SINDIN, SDC-350, China), with a water droplet volume of 3 μL. The droplet volume is then increased from 3 μL to 6 μL and subsequently decreased from 6 μL to 3 μL to measure the advancing and receding contact angles of the sample surface. The contact angle hysteresis (CAH) is calculated as the difference between the advancing and receding angles.

The initial amount of lubricant ($m_0$) in the dendritic porous surface is determined by measuring the mass difference of the porous surface before and after lubricant infusion. To evaluate lubricant consumption, the sample is weighed periodically during frosting/defrosting and freezing/de-icing cycles to determine the remaining amount of lubricant ($m_i$). The lubricant retention rate is calculated as $(m_i/m_0)\times100\%$.

A droplet detachment experiment is used to investigate the lubricant consumption and self-healing performance of the dendritic composite porous surface. Water droplets are produced using a syringe connected to a peristaltic pump (Rongbai, BT100-2J, China), with the syringe needle positioned 1 cm above the sample. Water droplets of 8 μL in volume are continuously deposited on the inclined sample surface (tilted at 30°). During this process, the lubricant is gradually removed by the motion of the droplets resulting in lubricant consumption. To test the self-healing performance of the sample after lubricant consumption, droplets are deposited on the sample at a faster rate of 180 drops per minute. When the lubricant at the top of the pores is nearly consumed and the SLIPS loses its lubricating performance (defined as the standard for depletion of surface lubricant), the peristaltic pump is stopped. The sample is then left at room temperature until a new lubricant film formed on the porous surface, which is considered complete self-healing. The self-healing time is recorded. The droplet detachment experiment is repeated on the healed sample until the self-healing time exceeds 48 hours (i.e., the self-healing speed during 48h is investigated, assuming extreme weather typically lasts for 48 hours). To study the lubricant consumption rate on the dendritic porous surface, water droplets are deposited slowly on the inclined surface (at a rate of 30 drops per minute). Contact angle (CA), contact angle hysteresis (CAH), and microscopic images are measured and recorded at different time intervals.

Note: Self-healing of the anti-icing conductor does not occur after every single droplet is dropped to the conductor. In this experiment, it is observed that one self-healing event typically occurs after 180 droplets. Considering that in low-temperature environments, falling water droplets would likely freeze, this experiment is conducted at room temperature to serve as an accelerated test.

2. Results

2.1 Determination of the Optimal Pore Depth Ratio

2.1.1 Morphology

Figure 1:
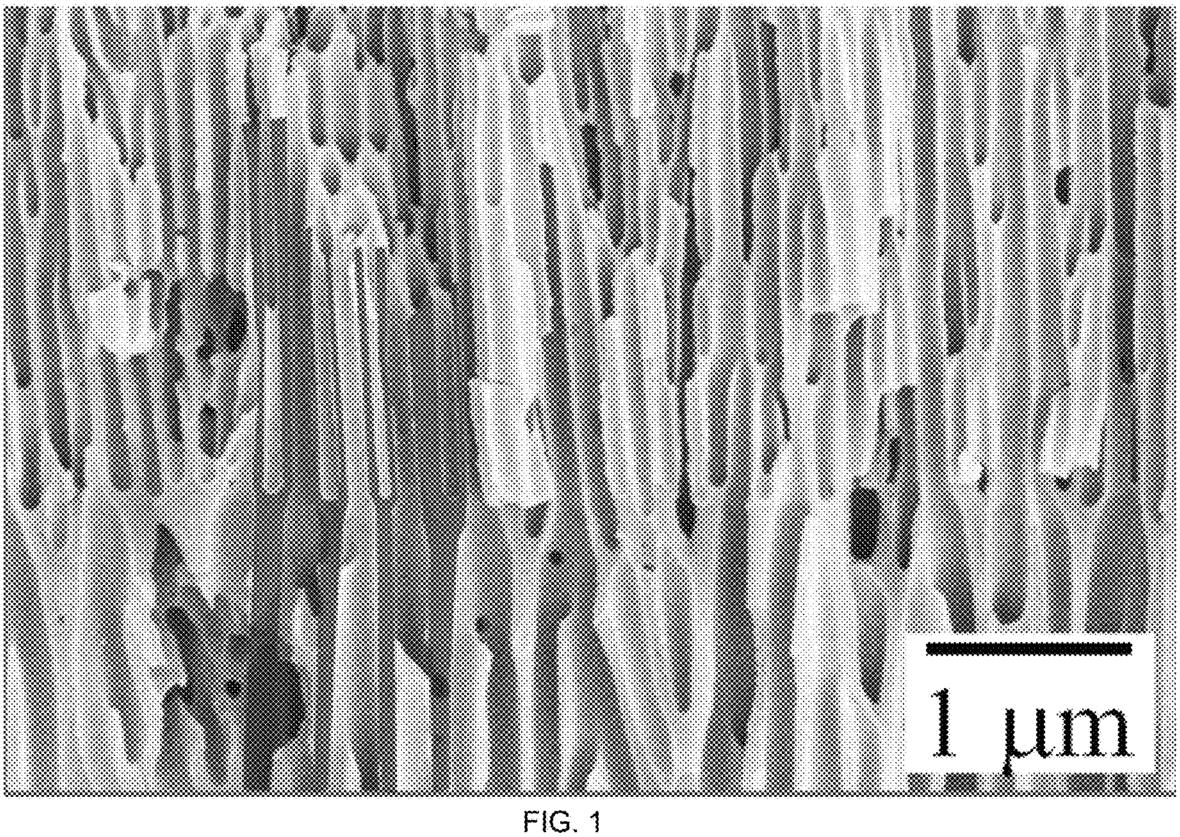
FIG. 1 is a scanning electron microscope (SEM) image of the dendritic composite porous structure of the present invention.
Figure 2:
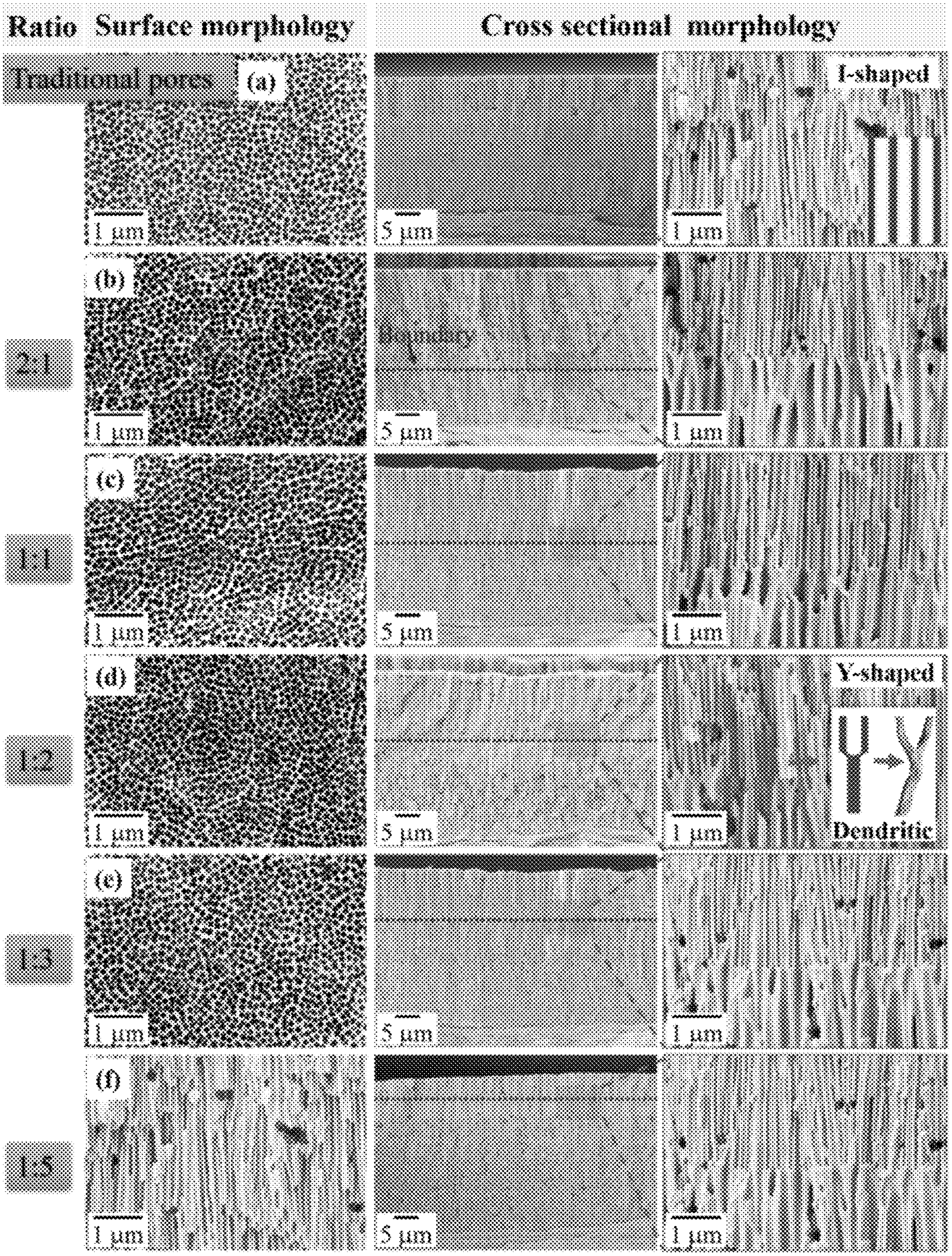
FIG. 2 shows the morphological characteristics of samples under different pore depth ratios (the pore depth ratio of upper pores to lower pores being (a) 1:0, (b) 2:1, (c) 1:1, (d) 1:2, (e) 1:3, and (f) 1:5, respectively).

FIG. 2 shows the morphological characteristics of samples under different pore depth ratios.

2.1.2 Structural Parameters

This includes surface porosity, pore depth, as well as pore diameter and inter-pore spacing of a cross-section.

TABLE 1

Surface porosity and pore depth

| Pore depth ratio (upper pores:lower pores, upper to lower) | | Conventional porous structure (I-shaped, "I") (1:0) | Dendritic composite porous structure (Y-shaped, "Y") 2:1 | 1:1 | 1:2 | 1:3 | 1:5 |
|---|---|---|---|---|---|---|---|
| Surface | Average pore size (nm) | 114.9 ± 10.8 | 118.9 ± 13.3 | 117.3 ± 13.4 | 116.6 ± 14.9 | 117.1 ± 16.6 | 115.6 ± 12.5 |
| | Porosity (%) | 66 | 67 | 67 | 66 | 67 | 66 |
| Cross-section | Upper-layer pore depth (μm) | 30.7 | 19.9 | 14.7 | 9.7 | 7.5 | 5.3 |
| | Lower-layer pore depth (μm) | — | 10.9 | 15.5 | 21.0 | 22.6 | 25.5 |
| | Total pore depth (μm) | 30.7 | 30.8 | 30.2 | 30.7 | 30.1 | 30.8 |

TABLE 2

Pore diameter and inter-pore spacing of the cross-section

| Pore depth ratio (upper to lower) | | | Conventional porous structure ("I") (1:0) | Dendritic composite porous structure ("Y") 2:1 | 1:1 | 1:2 | 1:3 | 1:5 |
|---|---|---|---|---|---|---|---|---|
| Cross-section | Upper-layer | Average pore size (nm) | 85.8 | 80.6 | 78.0 | 83.8 | 78.5 | 75.8 |
| | Lower-layer | Average pore size (nm) | — | 180.2 | 185.0 | 198.3 | 188.9 | 190.1 |

Conclusion: This embodiment successfully prepares dendritic porous structures with different pore depth ratios. As the structure satisfies the requirement that the total area of lower pores is greater than that of the upper pores (see FIG. 10), the dendritic porous structure has a larger volume than conventional single-layer porous structures and is capable of storing more lubricant.

When the pore depth ratio (upper to lower) of the dendritic porous structure is 1:2, the total pore depth is 9-31 μm. Experimental results show that when the pore depth exceeds 31 μm, the resistivity of the conductor increases beyond 0.1131 Ω/km, which exceeds the limit defined by GB/T 1179-2017 *"Round Wire Concentric Lay Overhead electrical Stranded Conductors"*.

2.1.3 Rapid Water Droplet Detachment Experiment

Figure 3:
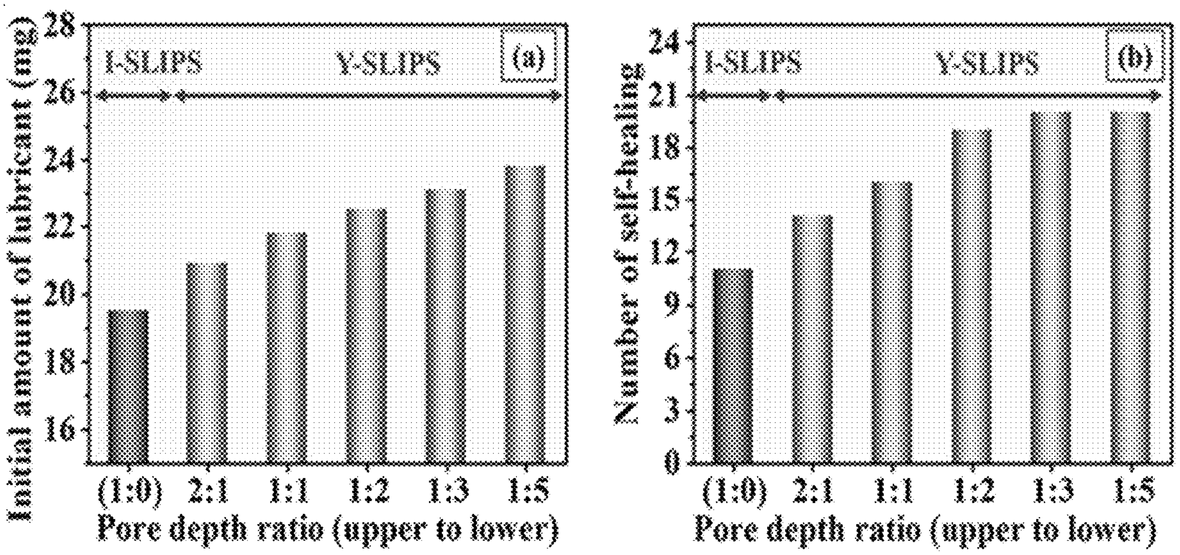
FIG. 3 is a bar chart showing the initial amount of stored lubricant and the number of self-healing cycles under different pore depth ratios ((a) initial amount of lubricant; (b) number of self-healing cycles).

FIG. 3 shows the initial amount of stored lubricant under different pore depth ratios, as well as the number of self-healing cycles under different pore depth ratios.

Figure 4:
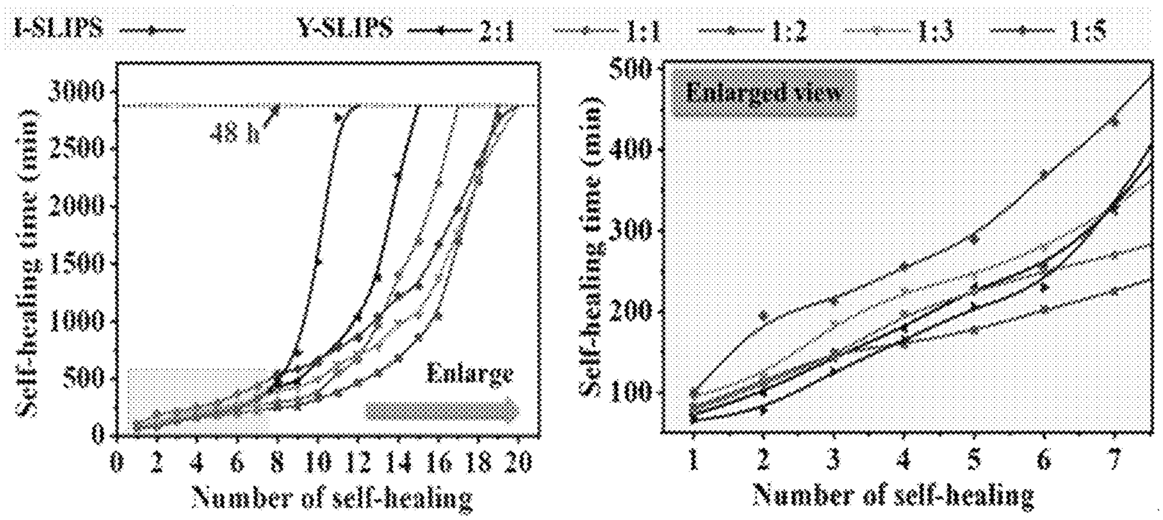
FIG. 4 is a curve showing the self-healing time under different pore depth ratios.

FIG. 4 shows the self-healing time under different pore depth ratios.

Conclusion: (1) The dendritic composite porous structure can store more lubricant than the conventional (traditional) single-layer porous structure. Due to the higher lubricant storage capacity, it also achieves a greater number of self-healing cycles than the conventional single-layer porous structure. (2) Increasing the pore depth of the lower pores enhances the storage capacity of the lubricant (e.g., a 1:5 pore depth ratio stores more lubricant than a 1:2 pore depth ratio). However, the number of self-healing cycles is found to be the same for both the 1:3 and 1:5 pore depth ratios, indicating that 1:3 pore depth ratio is a critical value. The 1:2 pore depth ratio yields only one fewer cycle than the 1:3 pore depth ratio. (3) It is also found that when the pore depth ratio is very small (e.g., 1:5), the proportion of lower pores increases. Since the lubricant migration speed is inversely proportional to the pore diameter, a smaller pore depth ratio results in longer self-healing time. (4) When the pore depth ratio (upper to lower) is 1:2, the self-healing time across the entire experiment is the shortest (e.g., for seven cycles of healing, the green curve on the left of the time axis shows the shortest duration), indicating the fastest self-healing speed.

In summary, considering both lubricant storage capacity and self-healing time/speed, the optimal pore depth ratio (upper to lower) is less than 1:2.

2.2 Determination of the Optimal Porosity

2.2.1 Morphology

Figure 5:
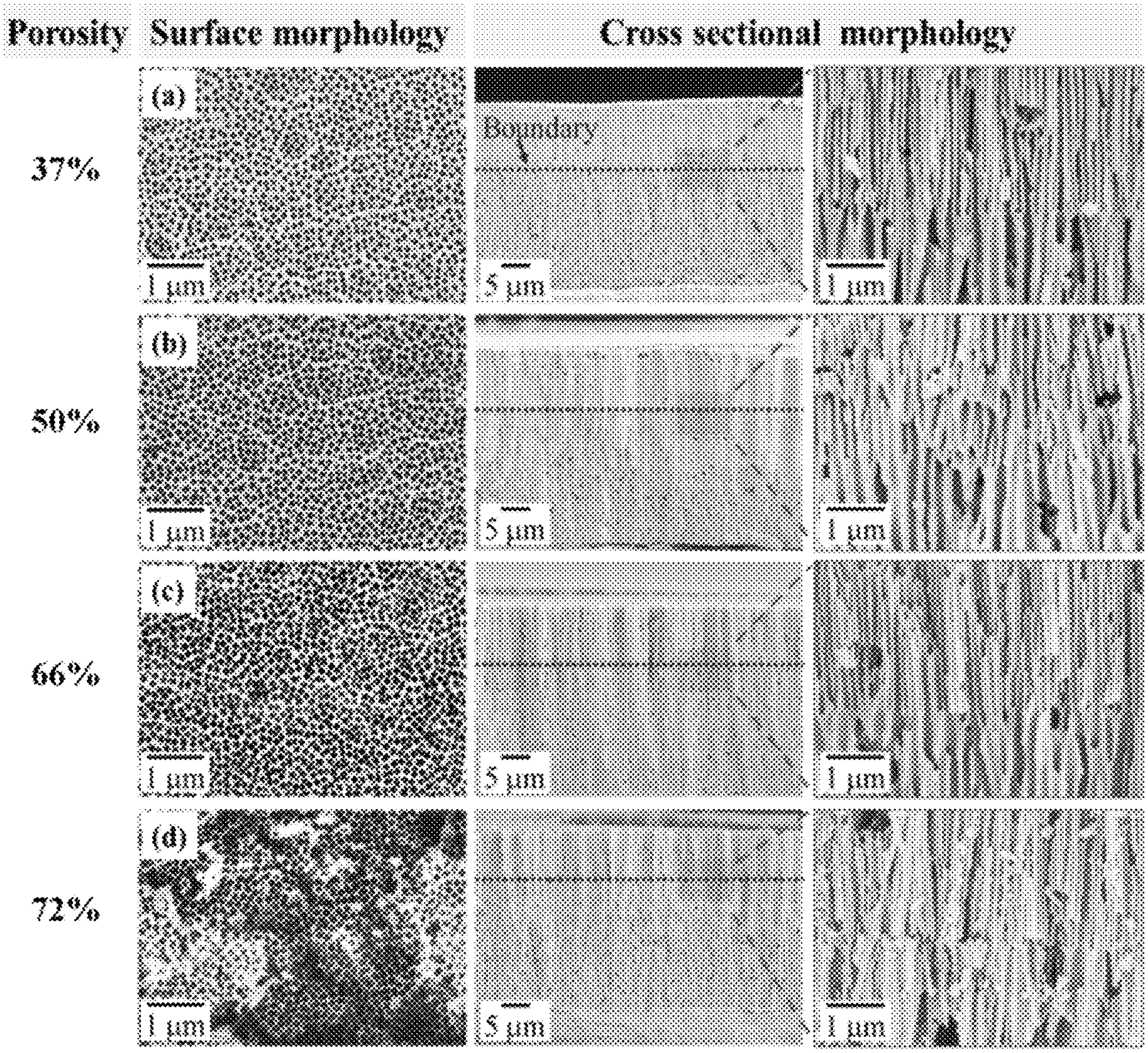
FIG. 5 shows the surface and cross-sectional morphology of porous structures with different porosity levels.

FIG. 5 shows the surface and cross-sectional morphology of porous structures with different porosity levels.

2.2.2 Structural Parameters

TABLE 3

Structural characteristics of porous surfaces with different surface porosity levels

| | | Dendritic composite porous structure ("Y") | | | |
|---|---|---|---|---|---|
| | Surface porosity (%) | 37 | 50 | 66 | 72 |
| Surface | Average pore size (nm) | 80.6 ± 9.7 | 98.0 ± 11.2 | 116.6 ± 14.9 | 131.1 ± 21.0 |
| | Upper-layer pore depth (μm) | 9.7 | 9.5 | 9.7 | 7.3 |
| Cross-section | Lower-layer pore depth (μm) | 20.2 | 21.2 | 21 | 21.5 |
| | Pore depth ratio (upper to lower) | 1:2 | 1:2 | 1:2 | 0.8:2 |
| | Total pore depth (μm) | 29.9 | 30.7 | 30.7 | 28.8 |

Conclusion: In this embodiment, dendritic porous structures with different surface porosity levels are prepared by performing a pore expansion process. When the pore depth ratio of the upper pores to the lower pores is 1:2, the surface porosity is 50%-66%.

Studies have confirmed that low porosity is detrimental to the stability of the lubricant film and the anti-wettability of the lubricated surface, as well as the lubricant storage capacity. In other words, porosity is related to the oil-retaining capability. However, when the pore expansion process increases the porosity beyond a certain threshold, it may lead to rupture of the pore walls and collapse of the upper pore structure, resulting in the formation of micron-scale corrosion pits (i.e., larger pores). This not only compromises anti-wetting performance but also accelerates lubricant consumption. FIG. 6 shows enlarged views of structures with different porosity levels, indicating that when the porosity reaches 72%, the pore structure is visibly damaged. Among the porous structures prepared, the morphology is found to be optimal when the porosity is 66%.

2.2.3 Slow Water Droplet Detachment Experiment

FIGS. 7 and 8 show the experimental results of porous structures with different porosity levels in the slow water droplet detachment experiment.

Conclusion: The results further confirm that increasing surface porosity enhances the lubricant storage capacity and shortens the self-healing time. However, when surface porosity becomes too high (e.g., 72%), partial collapse and damage of the pore walls occur, accelerating lubricant consumption. Therefore, considering lubricant storage capacity, lubricant consumption, and self-healing speed comprehensively, the optimal surface porosity is approximately 66%.

Embodiment 3

Determination of the spacing between adjacent pores (inter-pore spacing) in the dendritic porous structure

1. Experiment

The dendritic porous structure is prepared using the method described in Embodiment 1. The inter-pore spacing is measured using the ImageJ software based on scanning electron microscope (SEM) images.

2. Results

2.1 Effect of Inter-Pore Spacing on Ice Adhesion Strength

In general, the spacing between adjacent pores is correlated with the ice adhesion strength. Smaller inter-pore spacing leads to lower ice adhesion strength. However, if the inter-pore spacing becomes too small, friction between the ice and the structure surface during the de-icing process increases, which may result in structural damage to the pores. FIG. 9 shows the effect of inter-pore spacing on ice adhesion strength.

Conclusion: This embodiment confirms that when the porosity of the dendritic composite porous structure is within the range of 50%-66%, the ice adhesion strength on the dendritic composite porous structure is not greater than 5 kPa. In contrast, in the prior art, the ice adhesion strength of anti-icing conductors is typically defined at no greater than 20 kPa. Furthermore, the experimental results of this embodiment reveal that as the ice adhesion strength on the anti-icing conductor decreases, both the volume and thickness of accreted ice on the conductor are significantly reduced—substantially below the critical icing thickness of 30 cm commonly observed in the prior art. As a result, when ice blocks or icicles formed on the conductor detach from the conductor, the amplitude of de-icing jumping or galloping is significantly reduced, thereby contributing to the extended service life of the conductor.

Experimental results of this embodiment further reveal that when the ice adhesion strength is controlled below 5 kPa, the inter-pore spacing of the structure prepared by the method of the present invention falls within the range of 10 nm 38 nm. When the inter-pore spacing exceeds 38 nm, the ice adhesion strength rises above 5 kPa. If the inter-pore spacing falls below 10 nm, de-icing operations on the sample surface may damage the pore structure.

2.2 Volume of Different Porous Structures Under Identical Inter-Pore Spacing

FIG. 10 compares the pore volume of different porous structures when the inter-pore spacing is identical.

Conclusion: The formula for calculating the pore area is as follows:

Wherein m, n, and k respectively represent the number of pores; A and B represent the pore areas; V represents the pore volume; and H represents the pore depth. For a simple composite porous structure, it must hold that $V_2>V_1$.

$$V_1=\left(\sum_{i=1}^{n}A_i\right)(H_1+H_2);\ V_2=\left(\sum_{i=1}^{n}A_i\right)H_1+\left(\sum_{i=1}^{n}B_i\right)H_2.$$

When the pores are densely arranged such that the inter-pore spacing is sufficiently small, the volume ($V_3$) of a single-layer porous structure may also exceed $V_2$. Therefore, the design of a simple composite porous structure does not necessarily demonstrate a greater lubricant storage capacity compared to a single-layer porous structure.

$$V_3=\left(\sum_{i=1}^{m}A_i\right)(H_1+H_2).$$

However, in the dendritic composite porous structure prepared in this embodiment, the upper pores are densely arranged and the volume of the lower pores is increased:

$$V_4=\left(\sum_{i=1}^{m}A_i\right)H_1+\left(\sum_{i=1}^{k}B_i\right)H_2.$$

Therefore, in order to ensure $V_4>V_3$, $$\sum_{i=1}^{m}A_i>\sum_{i=1}^{k}B_i$$

must be satisfied. Accordingly, in the dendritic composite porous structure designed in this embodiment, m:k=4-6:1; $A_i:B_i$=1:3~1:2.

Embodiment 4

Functional Characterization of the Dendritic Composite Porous Structure

Durability Verification of the Lubricated Surface with Dendritic Porous Structure 1. Characterization Measurement of ice adhesion strength. The sample is fixed on a platform inside an environmental chamber. A hollow cylindrical plastic mold is placed on the sample surface and filled with water to a height of approximately 10 mm. The temperature and humidity in the chamber are maintained at −15° C. and 40%, respectively. After 30 min, the water is completely frozen, forming an ice block with a diameter of 14.2 mm. A force sensor (HANDPI, SH-100N, China) is used to push the mold horizontally, with the probe kept 3 mm from the sample surface and a loading speed of approximately 1 mm/s. The maximum shear force during the separation of the mold from the sample is recorded, and the ice adhesion strength is subsequently calculated. Durability of the SLIPS is evaluated through repeated icing/de-icing cycles. The icing procedure follows the same steps as the ice adhesion strength test. Ice is mechanically removed to complete one icing/de-icing cycle. During the cycles, the sample's contact angle (CA), contact angle hysteresis (CAH), ice adhesion strength, and lubricant retention rate are measured. Both conventional single-layer porous surfaces and dendritic porous surfaces are tested repeatedly for frosting/defrosting cycles until the ice adhesion strength of the dendritic porous surface exceeds 20 kPa (the upper limit for self-deicing behavior of anti-icing surfaces).

Frosting experiments are conducted using a Peltier cooling plate maintained at −8° C. to test the anti-frosting performance of SLIPS. The plate is enclosed with insulating foam, and humidity is maintained at approximately 99% using a humidifier. Macroscopic images of the frosting process are recorded using a camera, and the microscopic morphology is measured using a digital microscope (MIXOUT, SM-U500, China). The frosting time is recorded when all condensation droplets on the sample surface has frozen. Durability of SLIPS is evaluated through multiple frosting/defrosting cycles. After the surface of the sample on the cooling plate is fully frosted, the frosted layer is heated to remove the frost, completing one cycle. Ice adhesion strength, CA, frosting time, and lubricant retention rate are measured during cycles. Long-term icing/de-icing cycle tests are conducted on both conventional single-layer porous surfaces and dendritic porous surfaces. Once the ice adhesion strength exceeds 20 kPa, the sample is allowed to rest for 12 hours for sufficient self-healing. The icing/de-icing-healing cycle is repeated until the ice adhesion strength still exceeds 20 kPa after self-healing.

2. Results 2.1 Frosting/Defrosting Cycles

FIGS. 11 and 12 show the results of the frosting/defrosting cycles on conventional single-layer porous surfaces (I-SLIPS) and dendritic composite porous surfaces (Y-SLIPS).

Conclusion: (1) The dendritic composite porous surface (Y-SLIPS) exhibits an ice adhesion strength exceeding 20 kPa at the 140th frosting/defrosting cycle, surpassing the critical threshold defined in the prior art. In contrast, the conventional single-layer porous surface (I-SLIPS) reaches the 20 kPa threshold at the 100th frosting/defrosting cycle. (2) With an increasing number of the frosting/defrosting cycles, the frosting time on the lubricated surfaces decreases, indicating a decline in the self-healing capability of the conductor. At the 140th frosting/defrosting cycle, the dendritic composite porous surface shows a drop in anti-frosting performance, whereas the conventional single-layer porous surface (I-SLIPS) exhibits a significantly shorter frosting time, demonstrating that Y-SLIPS has superior long-term anti-frosting durability compared to I-SLIPS.

2.2 Long-Term Icing/De-Icing Cycles

Conclusion: Using the same critical ice adhesion strength threshold of 20 kPa defined by the prior art, Y-SLIPS is able to endure approximately 190 icing/de-icing cycles. This is attributed to its higher lubricant storage capacity, slower lubricant consumption, and timely self-healing, which help maintain low ice adhesion strength. Y-SLIPS exhibits six effective self-healing events before failure occurred on the seventh attempt. Under the same conditions, I-SLIPS could only endure 140 icing/de-icing cycles, with the ice adhesion strength exceeding 20 kPa after the 140th icing/de-icing cycle. I-SLIPS exhibits only four effective self-healing events, failing on the fifth. Therefore, compared to I-SLIPS, the Y-SLIPS structure formed using the dendritic composite porous structure demonstrates superior anti-icing durability and longer service life under icing conditions.

Embodiment 5

Effect of the Preparation Method on the Dendritic Composite Porous Structure 1. A brief description of the preparation method is as follows:

(1) First, anodization is performed in an $H_2C_2O_4$ electrolyte for 6-10 min to form the upper pores (also referred to as oxalic acid small pores in the upper layer).

(2) Next, anodization is performed in an $H_3PO_4$ electrolyte for 7-12 min to form the lower pores (referred to as phosphoric acid large pores in the lower layer).

(3) Finally, immersing the formed two-layer porous structure in an $H_3PO_4$ solution for 0-45 minutes to perform pore expansion (expand the pore diameter of the formed two-layer porous product).

The challenge in this preparation method lies in the second anodization step: the phosphoric acid electrolyte tends to dissolve the already formed oxalic acid pores in the upper layer. By controlling the concentration of aluminum ions in the solution, the chemical dissolution rate of the upper pore walls by phosphoric acid can be regulated. Anodization is currently the most convenient and effective method for preparing nanoporous structures. However, using anodization to create multilayer porous structures involves a dynamic process in which new pores form while previously formed pores dissolve. If this process is not properly controlled, it becomes difficult to obtain a porous structure that meets the requirements.

Therefore, by adjusting the anodization current and anodization duration, dendritic composite porous structures with different pore depth ratios and total depths can be obtained. Dendritic porous structures with different porosity levels can also be achieved by controlling the concentration of aluminum ions. Changes in anodization duration and current density affect not only the pore depth ratio but also the surface characteristics of the pores.

2. Results 2.1 Effect of aluminum ion concentration on the surface morphology of the formed dendritic composite porous structure is shown in FIG. 13.

TABLE 4

Experimental results of aluminum ion concentration

| | Aluminum ion concentration | | | | |
|---|---|---|---|---|---|
| | 0-330 mg/L | 330-600 mg/L | 600-700 mg/L | 700-1000 mg/L | >1000 mg/L |
| Surface morphology | Pore walls ruptured | Partial rupture of surface pore walls | Densely arranged small pores | Relatively sparse nano-scale pore arrangement | Even sparser nano-scale pore arrangement |

Conclusion: When the concentration of aluminum ions is in the range of 600-700 mg/L, densely arranged small pores are readily formed on the surface, which meets the performance requirements for active anti-icing as described in the present invention.

2.2 Experimental results under different anodization durations and current densities are shown in FIG. 14.

TABLE 5

Experimental results of different anodization durations and current densities

| | | Current density | | |
|---|---|---|---|---|
| | | <0.08 A/cm$^2$ | 0.08~0.16 A/cm$^2$ | >0.16 A/cm$^2$ |
| | | Anodization duration | | |
| | | <12 min | 12-18 min | >18 min |
| | | Surface morphology | | |
| | | Sparse nano-scale pores | Densely arranged small pores | Pore walls ruptured |
| Pore depth of upper and lower layers | Upper layer (μm) | 11.8 | 9.7 | 7.3 |
| | Lower layer (μm) | 8.5 | 21.0 | 23.2 |

Conclusion: Densely arranged small pores meeting the requirements can be obtained by controlling the anodization current density (0.08~0.16 A/cm$^2$) and anodization duration (12-18 min). In addition, the anodization current density and duration also affect the depth of the resulting pores.

Embodiment 6

Comparison Between the Dendritic Composite Porous Structure Prepared by the Method of the Present Invention and the Composite Porous Structure in the Prior Art

TABLE 6

Comparison of different composite porous structures

| Comparison item | Dendritic composite porous structure | Composite porous structure in the prior art |
|---|---|---|
| Porous structure | Dendritic porous structure with a smaller upper pore and a larger lower pore; the depth ratio of the upper pore to the lower pore is less than 1:2; the number ratio of the upper pore to the lower pore is 4-6:1. The composite porous structure is fully filled with a modifier. | Two-layer composite porous structure with a larger outer pore and a smaller inner pore; the depths of the inner and outer pores are the same; the inner pore is filled with a healing agent, and the outer pore comprises an air cushion. |
| Function of pores | The larger lower pore stores the modifier and the smaller upper pore reduces the consumption. The non-1:1 (the number ratio of the upper pore to the lower pore) arrangement allows more storage of the modifier. | The inner pore stores the healing agent and the outer pore forms an air cushion to repel water droplets under low temperature conditions. |
| Preparation method | 1. Oxidation in $H_2C_2O_4$ electrolyte to form the upper pore.<br>2. Oxidation in $H_3PO_4$ electrolyte to form the lower pore.<br>3. Immersion of the formed two-layer porous structure in $H_3PO_4$ solution to perform pore expansion. | 1. Oxidation in $H_3PO_4$ electrolyte to form the outer pore.<br>2. Oxidation in $H_2C_2O_4$ electrolyte to form the inner pore. |
| Surface ice adhesion strength | Not greater than 5 kPa | 6.5 kPa |
| Problem addressed | Active anti-icing | Delayed icing |

The embodiments of the present invention are described above with reference to the accompanying drawings, but the present invention is not limited to the aforementioned specific embodiments. The aforementioned embodiments are merely illustrative and not limiting. For those of ordinary skill in the art, many forms can be made under the teaching of the present invention without departing from the spirit of the present invention and the scope of the claims, all of which shall fall within the protection scope of the present invention.

The invention claimed is:

1. An active anti-icing conductor for use in a low-temperature and high-humidity environment, wherein a surface ice adhesion strength of the active anti-icing conductor is not greater than 5 kPa; wherein the active anti-icing conductor is a dendritic composite porous structure formed on an aluminum substrate; the dendritic composite porous structure is configured to comprise an upper layer and a lower layer, wherein a total pore depth of the dendritic composite porous structure is 5-31 μm; a pore diameter of an upper pore in the upper layer is smaller than a pore diameter of a lower pore in the lower layer, and a pore diameter ratio of the upper pore to the lower pore is 1:3~1:2; a pore depth ratio of the upper pore to the lower pore is less than 1:2; a ratio of number of the upper pore to number of the lower pore is 4-6:1; both the upper pore and the lower pore are filled with a modifier and a lubricant; a surface porosity of the dendritic composite porous structure is 50-66% with an inter-pore spacing of 10-38 nm.

2. The active anti-icing conductor according to claim 1, wherein the surface porosity of the dendritic composite porous structure is 66%.

3. The active anti-icing conductor according to claim 1, wherein the modifier is silane-ethanol.

4. A method for preparing the active anti-icing conductor according to claim 1, wherein the method comprises two anodization processes and one pore expansion process, comprising the following steps:

(1) First anodization: placing a cleaned aluminum substrate in an $H_2C_2O_4$ electrolyte, and applying an anodization current of 0.08~0.16 A/cm$^2$ for 6-10 min to form an upper porous structure;

(2) Second anodization: placing the product obtained in step (1) in an $H_3PO_4$ electrolyte, and applying an anodization current of 0.08~0.16 A/cm$^2$ for 7-12 min to form a lower porous structure, wherein the lower porous structure forms while the upper porous structure dissolves, and a concentration of an aluminum ion is adjusted to 600-700 mg/L;

(3) Pore expansion: immersing the formed two-layer porous product in an $H_3PO_4$ solution for 0-45 min to perform pore expansion, and washing and drying the resulting dendritic composite porous structure;

(4) Filling with a modifier and a lubricant: filling the dendritic composite porous structure obtained in step (3) with a modifier using a vacuum infusion method to modify the dendritic composite porous structure, followed by filling with a lubricant, wherein the modifier is silane-ethanol.

5. The method according to claim 4, wherein a mass percentage of the silane-ethanol used in step (4) is 2 wt. %.

* * * * *